United States Patent Office
2,755,262
Patented July 17, 1956

2,755,262
PLASTICIZED COMPOSITIONS

Max Henry Dilke, Coulsdon, Donald Faulkner, Epsom, and Sidney Merry, Edgware, England, assignors to The Distillers Company Limited, Edinburgh, Scotland, a British company No Drawing. Application August 4, 1952,
Serial No. 302,633

Claims priority, application Great Britain August 23, 1951

11 Claims. (Cl. 260—29.1)

The present invention relates to plasticised compositions containing vinylidene chloride polymers and copolymers. More particularly it relates to such compositions with improved stability towards heat and/or light.

Polymers and copolymers of vinylidene chloride are capable of being softened under the influence of heat and pressure, and may thus be moulded to form useful articles, whilst some may be extruded and drawn to form useful fibres or filaments. Such polymers, however, have the disadvantage that they tend to darken and decompose at temperatures above their softening points. It is customary to add a plasticiser to the polymer in order to reduce the softening temperature to a level where thermal decomposition becomes less serious, but, with many plasticisers, this level is only reached at concentrations of plasticiser which are sufficiently high to impair the physical properties of moulded articles or filaments. It is important, therefore, to provide plasticisers which give compositions of adequate thermal stability at the working temperature when used in sufficiently low concentrations to give products of adequate rigidity or tensile strength.

Articles or filaments obtained from plasticised compositions of vinylidene chloride polymers or copolymers are subject to the further disadvantage that they undergo some decomposition when exposed for long periods to the effects of light, especially when such light contains a high proportion of ultraviolet radiation. This decomposition is accompanied by a progessive darkening in colour of the composition, which may change from a practically colourless appearance to dark brown if the action of the radiation is prolonged. General deterioration in mechanical properties may also occur. To overcome the deleterious effects of exposure to radiation, it is therefore customary to incorporate light stabilisers in the vinylidene chloride polymer or copolymer. Such stabilisers are materials showing a high absorption in the ultra-violet region of the spectrum, and are able to screen the polymer from the damaging effects of short wave-length radiations; examples of such materials are phenyl salicylate, p-xenyl salicylate, the methyl, ethyl and butyl esters of 2-hydroxy-3-naphthoic acid, 5-chloro-2-hydroxybenzophenone, 4-chloro-2-hydroxybenzophenone, 5-methyl-2-hydroxybenzophenone, 4-methyl-2-hydroxybenzophenone, 3:4-dimethyl-2-hydroxybenzophenone, 4:6-dimethyl-2-hydroxybenzophenone, 3:4:6-trimethyl-2-hydroxybenzophenone, 3:5-dichloro-2-hydroxybenzophenone, 5-methyl-2-hydroxyacetophenone, 5-chloro-2-hydroxyacetophenone, fluorenone azine and mixed fluorenone azines such as benzal- and salicylalfluorenone azine. However, it has been found that the efficiency of the light-stabiliser varies considerably with the plasticiser employed.

It will be seen, therefore, that both the light and heat stability of polymeric vinylidene chloride compositions depend to a considerable extent on the particular plasticisers incorporated in the composition. Many of the more commonly used plasticisers, when used with vinyl-idene chloride polymers or copolymers in such quantity that the resultant product has adequate rigidity or tensile strength, give resinous compositions which have inadequate heat and/or light stability. Thus, the higher alkyl phthalates such as dibutyl and di-2-ethylhexyl phthalates give compositions of fair light stability but of poor heat stability such that extruded filaments made therefrom are of poor colour owing to the decomposition of the vinylidene chloride caused by the heat of the extrusion process. Tricresyl and trixylenyl phosphates, on the other hand, give compositions which have better resistance to thermal decomposition, but show an inferior stability towards light. In view of these difficulties encountered in the plasticisation and working of vinylidene chloride polymers and copolymers, it has been necessary to develop special plasticisers in order to permit the fabrication of useful filaments or articles of adequate heat and light stability. Such a special plasticiser is alpha-alpha'-diphenyldiethylether which is an expensive and not readily available compound.

One object of the present invention is to provide plasticisers which give compositions of adequate thermal stability at the working temperature when used in sufficiently low concentration to give products of adequate rigidity or tensile strength. A further object is to provide plasticised compositions containing vinylidene chloride polymers and copolymers which have good light stability.

It has now been found that di-esters of alpha-methylbenzyl alcohol with certain organic dibasic acids are valuable plasticisers for use with vinylidene chloride polymers and copolymers and that their compositions show satisfactory stability to heat and light. Dibasic acids whose esters with alpha-methylbenzyl alcohol are useful include carbonic acid, oxalic acid, and the saturated straight-chain alpha-omega dicarboxylic acids of formula HOOC.(CH$_2$)$_n$.COOH, where $n$ has values from 2–8. Unsaturated dibasic acids such as maleic and fumaric acids may be used. Phthalic, terephthalic, 1:2-naphthalene dicarboxylic, naphtalic and tetrachlorophthalic acids are examples of aromatic dibasic acids which may also be used. These ester plasticisers are believed to be new compounds which have not been described before.

According to the present invention there is provided a plasticised composition which comprises a polymeric resin containing at least 10% by weight of vinylidene chloride units in its molecular structure and as a plasticiser therefor a di-ester of alpha-methyl benzyl alcohol with a dibasic acid selected from the group consisting of benzene dicarboxylic acids, naphthalene dicarboxylic acids and nuclear chloro-substituted derivatives thereof, carbonic acid, oxalic acid, saturated straight-chain alpha-omega dicarboxylic acids of the formula

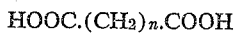

HOOC.(CH$_2$)$_n$.COOH where $n$ has values from 2–8, maleic acid and fumaric acid.

By the expression "vinylidene chloride unit" we mean the group —CH$_2$—CCl$_2$— present in polymers and copolymers of vinylidene chloride.

As polymeric resins for use in the production of the plasticised compositions of the present invention one may use polyvinylidene chloride and copolymers of vinylidene chloride with one or more copolymerisable compounds such as vinyl chloride, methyl acrylate, ethyl acrylate, methyl methacrylate, dimethyl maleate, diethyl maleate, vinyl acetate and acrylonitrile, and other copolymers which also show evidence of decomposition during processing and during subsequent exposure to light. The polymeric resins with which the plasticisers are incorporated suitably contain at least 10% of vinylidene chloride units. The plasticisers are particularly useful for the plasticisation of polymeric resins containing more than 70% vinylidene chloride units in their molecular structure. These resins are characterised in their ability to exist in crystalline and orientated crystalline states and by their tendency to form crystallites during processing and for these reasons they have hitherto been found particularly difficult to plasticise and work.

Esters of the above dibasic acids with alpha-methylbenzyl alcohol may be prepared by any suitable method. Owing, however, to the ease with which alpha-methylbenzyl alcohol undergoes dehydration to styrene in the presence of strong acids, direct esterification of the alcohol with dibasic acid in the presence of a mineral acid as esterification catalyst is not a particularly satisfactory method.

The two methods preferred for forming the esters are: (i) reaction of alpha-methylbenzyl alcohol with the chloride of the dibasic acid in the presence of a tertiary base such as dimethylaniline, pyridine, or quinoline to react with the byproduct hydrogen chloride; (ii) by ester interchange between alpha-methybenzyl alcohol and the dimethyl or diethylester of the dibasic acid in the presence of a metal alkoxide as catalyst.

The amount of plasticiser which may usefully be incorporated with the polymeric resin containing the vinylidene chloride units depends to some extent on the particular resin chosen and on the properties desired in the final product; in general, plasticiser contents of from 5 to 50 per cent of the weight of the resin are suitable. The plasticised compositions of the present invention are particularly suitable for the production of fibres or filaments when the polymeric resin contains more than about 70% vinylidene chloride units. With a fibre forming resin such as that prepared by the polymerisation of a monomer mixture of 85% of vinylidene chloride and 15% of vinyl chloride, the preferred quantity of plasticiser is of the order 7–14% of the weight of the resin. With less than 5% of plasticiser, the composition does not usually flow readily enough on heating and the extruded filament is discoloured due to degradation, whilst with more than 15% of plasticiser, the tensile strength of the extruded filaments tends to become too low.

The plasticiser may be mixed with the polymeric resin in any suitable way. Thus, for example, the plasticiser may be added directly to the finely powdered resin and intimate mixing effected by mechanical means, such as grinding in a ball mill. Alternatively, the plasticiser may be dissolved in a volatile organic solvent, such as acetone or benzene, the solution thoroughly mixed with the powdered resin and the solvent removed from the resulting composition by drying. If the vinylidene chloride-containing resin is capable of being dissolved in an organic solvent, the plasticiser may be added to the said solution to form a homogeneous mixture, and the plasticised composition recovered by evaporation. If the resin is available in the form of an aqueous dispersion of small particles, a solution of the plasticiser in a water-miscible organic solvent, such as ethanol, acetone, or dioxan, may be added slowly with stirring to such an aqueous dispersion, and the resulting uniform polymeric composition separated by filtration or other suitable means and subsequently dried. If the polymeric resin containing the vinylidene chloride units is to be prepared in aqueous dispersion, the plasticiser may be added to the monomer mixture prior to or during the polymerisation; at the end of polymerisation, an intimate mixture of plasticiser and finely divided resin may be separated by coagulation, filtration, or other suitable means.

The manner in which the plasticisers of this invention are prepared, and the manner in which they are added to the polymeric resin containing vinylidene units is not critical, provided that intimate mixing is obtained, and the resulting compositions, however prepared, show satisfactory flow properties and adequate heat stability at the temperatures required for processing. Further, provided an effective light stabiliser is also incorporated, the compositions show considerable stability on exposure to sunlight or light containing a high proportion of ultra-violet radiation. In addition to light stabilisers, compositions in which the plasticisers are incorporated may also contain, or be compounded with, lubricants, pigments, dyes and the like, used for the purpose of facilitating the processing of the compositions and for providing the required colour in the final article. Other heat- or light-stabilisers used or described in the art may also be present.

A further advantage of the plasticisers of the present invention resides in their general stability and in particular in their resistance to oxidative degradation. It has been found, surprisingly, that their stability is generally superior to the corresponding benzyl compound.

The following examples illustrate the practice of the invention, percentages and parts referred by being by weight unless otherwise specified.

*Example 1*

Di-alpha-methylbenzyl phthalate was prepared as follows:

A mixture of 250 parts alpha-methylbenzyl alcohol, 194 parts of dimethyl phthalate, and 270 parts of benzene was distilled slowly through a fractionating column until traces of water were absent from the distillate. A solution of sodium methoxide prepared by dissolving 0.6 part of sodium in 20 parts of methanol was added to the mixture, and distillation continued until no more benzene-methanol azeotrope could be removed. This azeotrope boils at 58.3° C. and contains 39.6% of methanol. The reaction mixture was treated with an equal bulk of water and steam distilled to remove the benzene and excess alpha-methylbenzyl alcohol. The residual oil was separated from the aqueous layer, washed with a little sodium carbonate solution and then with water, and finally dried by warming under vacuum. The di-alpha-methylbenzyl phthalate so obtained formed a pale yellow oil, having a saponification value of 310 mg. KOH/gram; it underwent decomposition when distillation was attempted at 1 mm. Hg pressure.

A vinylidene chloride-vinyl chloride copolymer containing about 88% vinylidene chloride units in its molecular structure was prepared from a monomer mixture consisting of 85% vinylidene chloride and 15% of vinyl chloride. 10 parts of the copolymer were mixed thoroughly with a solution of 1 part of di-alpha-methylbenzyl phthalate in 5 parts of acetone, and the acetone removed by evaporation. The resulting composition was formed into pellets and extruded from a small ram extruder of nickel through an orifice 0.030 inch in diameter, the barrel of the extruder being heated to a temperature of 170 to 175° C. The composition flowed quite readily to give clear, smooth and almost colourless filaments, whilst the material remaining in the extruder showed practically no signs of decomposition.

The copolymer referred to above was mixed with 10% of its weight of dibutyl phthalate and the composition thus obtained was extruded as described above to give a filament which was coloured due to the decomposition of the copolymer at the temperature of the extrusion.

Similar plasticised compositions showing good heat stability may be obtained by replacing the di-alpha-methylbenzyl phthalate plasticiser employed above with the same quantity of di-alpha-methylbenzyl tetrachlorophthalate or of a di-alpha-methylbenzyl naphthalate.

*Example 2*

Di-alpha-methylbenzyl succinate was prepared by ester interchange from alpha-methylbenzyl alcohol and diethyl succinate, using sodium ethoxide as catalyst and toluene as reaction medium and entraining agent for the ethanol produced. The reaction mixture was steam-distilled, and the crude product purified by vacuum distillation. The di-alpha-methyl-benzyl succinate boiled at 186–188° C./1 mm., and had a saponification value of 345 mg. KOH/gram.

The copolymer referred to in Example 1 was mixed with 10% of its weight of di-alpha-methylbenzyl succinate, and the composition was extruded as described in Example 1. It flowed readily to give clear, smooth and practically colourless filaments.

Similar plasticised compositions showing good heat stability may be obtained by replacing the di-alpha-methylbenzyl succinate plasticiser employed above with the same quantity of the di-alpha-methylbenzyl ester of oxalic, maleic or fumaric acids.

Example 3

Di-alpha-methylbenzyl sebacate was prepared from alpha-methylbenzyl alcohol and dimethyl sebacate according to the process outlined in Example 1. The crude product formed a pale orange-coloured oil, a portion of which was purified by distillation. The purified ester boiled at 217–219° C./1 mm.; its refractive index $n_D^{20}$ was 1.5118, and it had a saponification value of 288 mg. KOH/gram.

The copolymer referred to in Example 1 was mixed with 10% of its weight of di-alpha-methylbenzyl sebacate, and the composition was extruded as described in Example 1. It flowed readily to give clear, smooth and practically colourless filaments.

Example 4

Di-alpha-methyl benzyl carbonate was prepared from alpha-methyl benzyl alcohol and diethyl carbonate, using sodium ethoxide as catalyst according to the process outlined in Example 2. The ester could be distilled under reduced pressure without decomposition, and had B. P. 149–151° C./1.2 mm.; its refractive index $n_D^{20}$ was 1.5341 and it had a saponification value of 416 mg. KOH/gram.

The copolymer referred to in Example 1 was mixed with 10% of its weight of di-alpha-methyl benzyl carbonate, and the composition was extruded as described in Example 1. It flowed readily to give clear, smooth, and practically colourless filaments.

Example 5

Di-alpha-methyl benzyl adipate was obtained from alpha-methylbenzyl alcohol and dimethyl adipate according to the process described in Example 1. The ester boiled at 194–198° C./1 mm. with very slight decomposition; it has a saponification value of 316 mg. KOH/gram and its refractive index $n_D^{20}$ was 1.5220.

The copolymer referred to in Example 1 was mixed with 10% of its weight of di-alpha-methylbenzyl adipate and the composition was extruded as described in Example 1. It flowed readily to give clear, smooth and practically colourless filaments.

Example 6

Di-alpha-methylbenzyl terephthalate was prepared as follows:

A solution of 8 parts of terephthaloyl chloride in 73 parts of trichlorethylene was added to a solution of 10 parts of alpha-methylbenzyl alcohol and 4 parts of pyridine in 116 parts of trichlorethylene. The mixture became warm, and pyridine hydrochloride separated after a few minutes. The reaction mixture was heated at 60–70° C. for 1 hour to complete the reaction, cooled, and washed successively with dilute hydrochloric acid and sodium carbonate solution. After distilling off the trichlorethylene under reduced pressure, the residue was dissolved in light petroleum (B. P. range 80–100° C.). On standing, crude di-alpha-methyl benzyl terephthalate crystalised; it was purified by two re-crystallisations from light petroleum, when it had a constant melting point of 95–96° C.

A composition prepared from the copolymer referred to in Example 1 and 10% of its weight of di-alpha-methylbenzyl terephthalate showed a good heat stability when extruded as described in Example 1.

Example 7

Compositions were prepared from the copolymer referred to in Example 1 and 10% of its weight of di-alpha-methylbenzyl phthalate, succinate, sebacate, carbonate, adipate and terephthalate together with 2% of its weight of 5-chloro-2-hydroxybenzophenone as light stabiliser. These compositions were extruded as described in Example 1 and the resulting filaments drawn by hand so that the diameter was reduced to 0.006 to 0.010 inch. The resulting threads were wound on formers and exposed to light from a carbon arc in a fadeometer. The time was noted at which the specimens reached approximately the same degree of discolouration as that shown by a sample of filament of the same copolymer plasticised with 8% of its weight of alpha-alpha'-diphenyldiethyl ether, but containing no light stabiliser, and exposed for 24 hours. The results obtained are given in the following table, together with exposures observed similarly for compositions containing 10% of tricresyl phosphate and 10% of dibutyl phthalate in place of the plasticisers of the present invention.

| Plasticiser | Hours exposed |
| --- | --- |
| Di-alpha-methylbenzyl carbonate | 600 |
| Di-alpha-methylbenzyl phthalate | 540 |
| Di-alpha-methylbenzyl succinate | 370 |
| Di-alpha-methylbenzyl adipate | 270 |
| Di-alpha-methylbenzyl terephthalate | 270 |
| Di-alpha-methylbenzyl sebacate | 240 |
| Dibutyl phthalate | 240 |
| Tricresyl phosphate | 130 |

Although the plasticised compositions according to the present invention as illustrated in the preceding examples are derived from a copolymer containing about 88% by weight of vinylidene chloride units and 12% by weight of vinyl chloride units in its molecular structure, it will be appreciated that similar plasticised compositions can be prepared from polyvinylidene chloride and copolymers of vinylidene chloride with copolymerisable monomers, such as methyl acrylate, ethyl acrylate, methyl methacrylate, dimethyl maleate, diethyl maleate, vinyl acetate and acrylonitrile and the like. All these vinylidene chloride polymers and copolymers containing more than about 10% by weight of vinylidene chloride units in their molecular structure show evidence of decomposition during processing and during subsequent exposure to light and accordingly may be advantageously plasticised with the novel plasticisers of the present invention.

We claim:

1. A plasticised composition comprising a polymeric resin containing at least 10% by weight of vinylidene chloride units in its molecular structure and as a plasticiser therefor a di-ester of alpha-methyl benzyl alcohol with a dibasic acid selected from the group consisting of benzene dicarboxylic acids, naphthalene dicarboxylic acids, nuclear chloro-substituted benzene dicarboxylic acids, nuclear chloro-substituted naphthalene dicarboxylic acids, carbonic acid, oxalic acid, saturated straight-chain alpha-omega dicarboxylic acids of the formula $HOOC.(CH_2)_n.COOH$ where $n$ has values from 2–8, maleic acid and fumaric acid.

2. A plasticised composition as claimed in claim 1, wherein the polymeric resin contains at least 70% by weight of vinylidene chloride units in its molecular structure.

3. A plasticised composition as claimed in claim 1, wherein the quantity of the di-ester is in the range 5 to 50% by weight of the polymeric resin present.

4. A plasticised composition as claimed in claim 2, wherein the polymeric resin is a fibre-forming resin and the quantity of di-ester is in the range 7–14% by weight of the polymeric resin present.

5. A light-stabilised composition comprising a plasticised composition as claimed in claim 1 and mixed therewith a light-stabiliser.

6. A light-stabilised composition as claimed in claim 5, wherein the light-stabiliser is 5-chloro-2-hydroxybenzophenone.

7. A plasticised composition as claimed in claim 1, wherein the plasticiser is di-alpha-methylbenzyl carbonate.

8. A plasticised composition as claimed in claim 1, wherein the plasticiser is di-alpha-methylbenzyl phthalate.

9. A plasticised composition as claimed in claim 1, wherein the plasticiser is di-alpha-methylbenzyl succinate.

10. A plasticised composition as claimed in claim 1, wherein the plasticiser is di-alpha-methylbenzyl adipate.

11. A plasticised composition as claimed in claim 1, wherein the plasticiser is di-alpha-methylbenzyl terephthalate.

References Cited in the file of this patent

UNITED STATES PATENTS

| | | |
|---|---|---|
| 1,023,758 | Raschig et al. | Apr. 16, 1912 |
| 2,049,565 | Holt | Aug. 4, 1936 |
| 2,138,860 | Hucks | Dec. 6, 1938 |
| 2,340,331 | Knutson et al. | Feb. 1, 1944 |
| 2,347,627 | Bruson | Apr. 25, 1944 |
| 2,437,420 | D'Alelio | Mar. 9, 1948 |
| 2,510,025 | Moyle | May 30, 1950 |
| 2,581,005 | Dazzi | Jan. 1, 1952 |
| 2,614,092 | Reilly | Oct. 14, 1952 |